United States Patent
Lego, Jr.

[11] 3,902,803
[45] Sept. 2, 1975

[54] HIGH PULSE REPETITION FREQUENCY ELECTRO-OPTICAL VIEWING SYSTEM

[75] Inventor: Louis J. Lego, Jr., Sauquoit, N.Y.

[73] Assignee: General Electric Company, Utica, N.Y.

[22] Filed: June 25, 1973

[21] Appl. No.: 373,062

Related U.S. Application Data

[63] Continuation-in-part of Ser. No. 222,789, Feb. 2, 1972, abandoned.

[52] U.S. Cl. .................. 356/5; 178/6.8; 250/553
[51] Int. Cl.² .................. G01C 3/08; H04N 3/00
[58] Field of Search ........ 250/217 SS, 553; 178/6.8; 356/4, 5; 343/7.3

[56] References Cited
UNITED STATES PATENTS

| | | | |
|---|---|---|---|
| 3,305,633 | 2/1967 | Chernoch | 356/5 |
| 3,467,773 | 9/1969 | Heckman, Jr. | 178/6.8 |
| 3,604,803 | 9/1971 | Kahn | 356/5 |
| 3,691,390 | 9/1972 | Chow et al. | 250/217 SS |

Primary Examiner—Maynard R. Wilbur
Assistant Examiner—S. C. Buczinski

[57] ABSTRACT

A system is provided including a pulsed source of radiation and a gated sensor for responding to optical returns from a predetermined range. A high pulse repetition rate and short duty cycle are employed in order to obtain real time response from the receiver. The receiver is gated with a wave form having a sharp rise time to provide the capability of backlighting selected targets and improving resolution.

9 Claims, 6 Drawing Figures

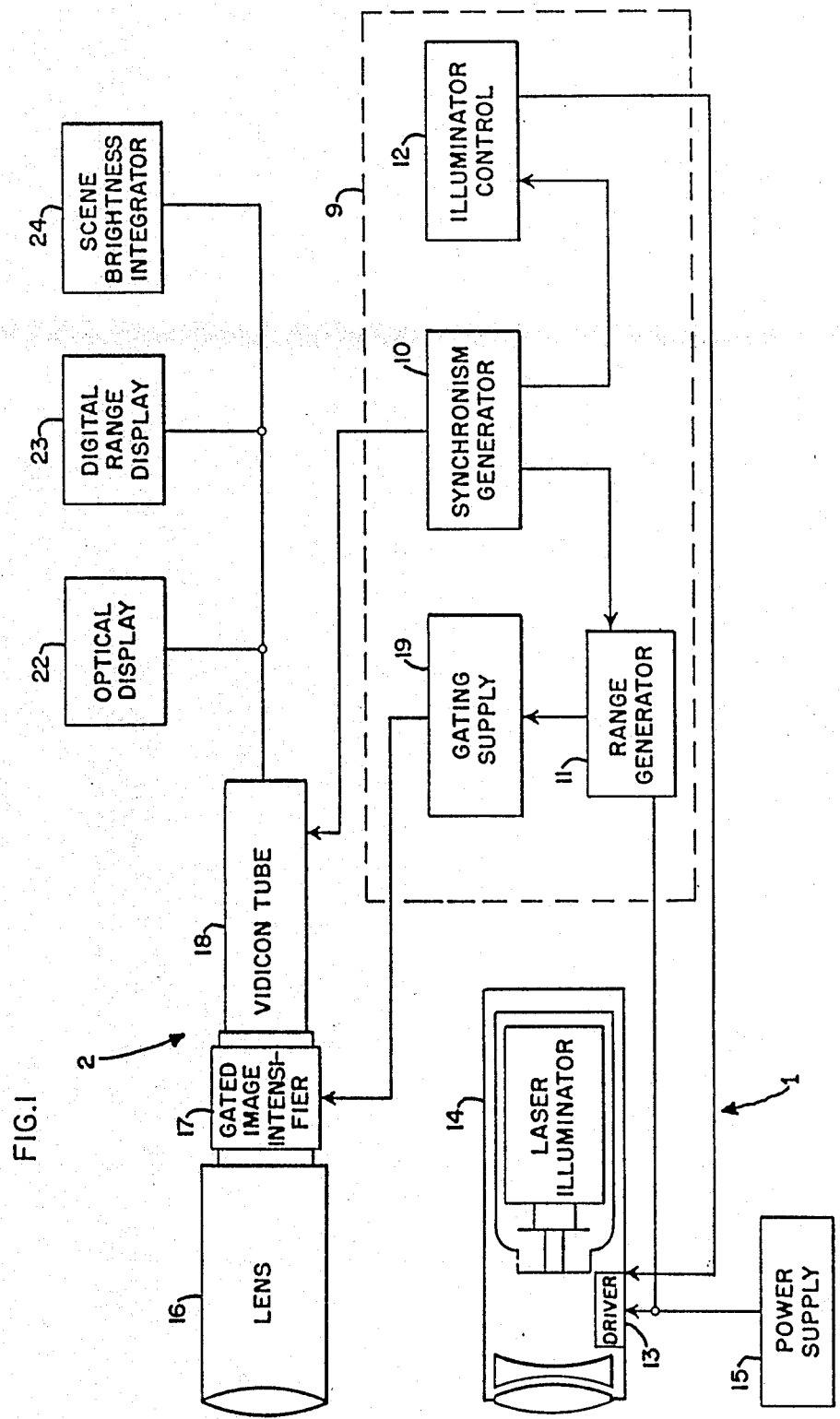

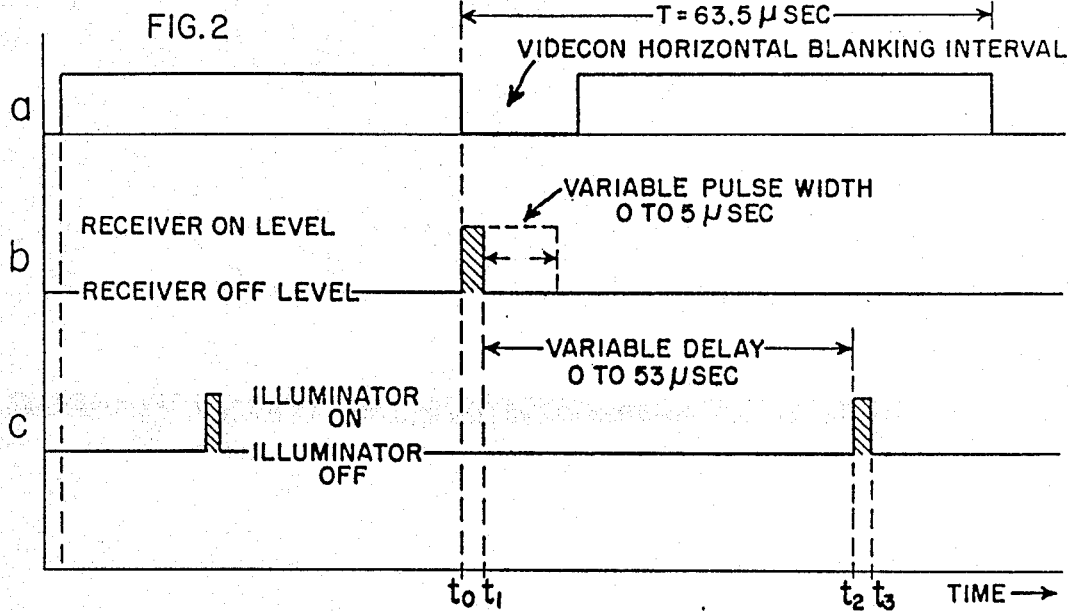
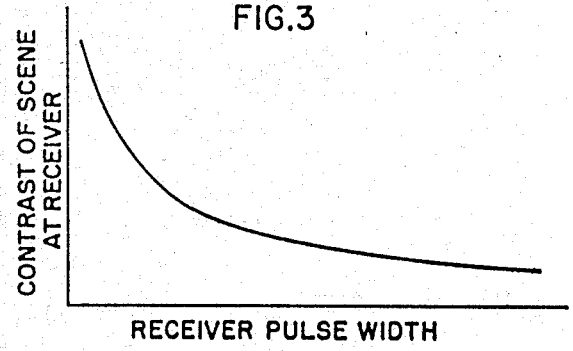
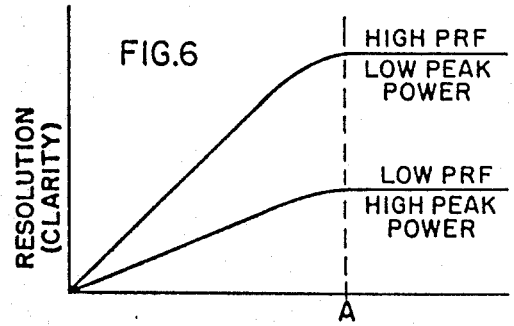
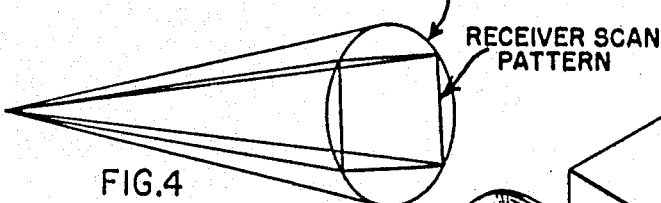
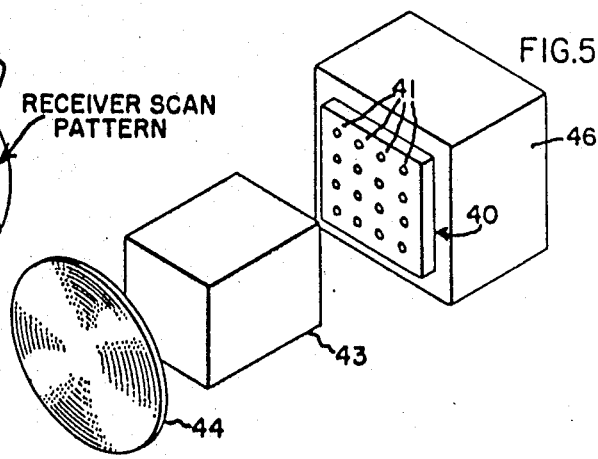

HIGH PULSE REPETITION FREQUENCY ELECTRO-OPTICAL VIEWING SYSTEM

CROSS-REFERENCE TO RELATED APPLICATION

This is a continuation-in-part of application Ser. No. 222,789, filed Feb. 2, 1972 by Louis J. Lego, Jr. entitled "Low Duty Cycle Electro-Optical Viewing System", now abandoned.

BACKGROUND OF THE INVENTION

The invention relates to an electro-optical system adapted for viewing targets under conditions of darkness or limited visibility.

In full field active electro-optical imaging systems, illumination is projected on a scene and is reflected back to a receiver, commonly including an image pickup tube. The source of illumination is generally a laser. If the illuminating device is on continuously, the light from the illuminator is scattered by particles in the air and enters the receiver as background noise. This scattered light, or backscatter, "washes out" the contrast between objects in the scene. For this reason, the systems are most often used in a pulse gated mode. In other words, the illuminator is successively turned on and off. In this mode of operation, the receiver is turned off while the illuminator is pulsed, or gated on. At a time when the pulse of illumination reflected from the scene of interest returns to the receiver, the receiver is gated to respond to the returned illumination and turned off before the next illumination pulse is transmitted. This method of operation has been referred to as a pulse-gating technique. The receiver is an image intensifier which is often used as a direct viewing display. Prior such systems have not worked well in poor weather since they generally utilize the high duty cycle in the pulse-gating scheme and are subject to a good deal of backscatter. Further, due to the large width of the pulse utilized, the receiving apparatus cannot be conveniently utilized to determine the range of a particular target within the scene. In addition, the television camera tubes have been used as the receiver. However, in such systems performance is limited by the duty cycle to systems having either a low pulse repetition rate with short pulses or high pulse repetition rate and long pulses. Low pulse repetition rate systems may be limited in that they do not provide a real time display. In other words, some interval of time on the order of seconds or longer, elapses before the display is produced. As explained before, long pulse systems have poor, foul weather capability.

In addition, prior systems use an illuminator providing a conical illumination pattern. However, the format of receivers is typically rectangular. Consequently, the receiver can only respond to a portion of the returned illumination.

SUMMARY OF THE INVENTION

It is, therefore, an object of the present invention to provide a pulse-gated electro-optical imaging system capable of providing accurate range information of a target.

It is also an object of the present invention to provide a system of the type described in which detrimental effects of foul weather on received signals are minimized.

It is another object of the present invention to provide a pulse-gated electro-optical detection system capable of backlighting a target within a scene.

It is a further object of the present invention to provide a system of the type described in which a receiver is gated at a high repetition rate and a low duty cycle.

It is another object of the present invention to provide a pulse-gated electro-optical detection system in which the use of the transmitted illumination pulse is maximized.

It is a further object of the present invention to provide an improved method of discrimination of a target illuminated by a pulse-gated system.

Briefly stated, in accordance with the present invention there is provided a system including a pulsed source of radiation and a gated sensor for responding to electro-optical returns from a predetermined range. A high pulse repetition rate and short duty cycle are employed in order to obtain real time response from the receiver. The receiver range gate is gated with a wave form having a sharp rise time to provide the capability of backlighting selected targets and improving resolution.

DESCRIPTION OF THE DRAWINGS

The means by which the foregoing objects and features of novelty which characterize the present invention are attained are pointed out with particularity in the claims forming the concluding portion of the specification. The invention, both as to its organization and manner of operation, may be further understood by reference to the following description taken into connection with the following drawings.

Of the drawings:

FIG. 1 is a block diagramatic representation of the system constructed in accordance with the present invention;

FIG. 2 is a timing diagram useful in understanding the operation of the present invention;

FIG. 3 is a chart illustrating a nominal relationship between receiver gate width and contrast of a scene in an optical display;

FIG. 4 is a diagram illustrating the field patterns of a conventional illumination source and that of the present invention as well as a typical receiver field pattern; and FIG. 5 is an illustration of a preferred form of illumination source for use in the present invention.

FIG. 6 is a graph illustrating resolution results obtained for two systems delivering the same range of average power to the receiver but operating with different pulse repetition frequencies and peak power levels.

DESCRIPTION OF THE PREFERRED EMBODIMENT

Referring now to FIG. 1, there is illustrated an electro-optical viewing system constructed in accordance with the present invention. A transmitter 1 provides pulses of illumination which are reflected from targets within a scene to a receiver 2. Because the system provides its own illumination, it is known as an active system. The theory and operation of the basic active system is described in U.S. Pat. No. 3,305,633 — Laser Optical System, issued Feb. 21, 1967 to J. P. Chernoch and assigned to General Electric Company, the assignee herein.

Operation of the system is controlled by a timing unit 9 which includes a synchronism generator 10. The synchronism generator 10 provides timing pulses to a range generator 11 and an illuminator control 12, both of which are further timing circuits. The range generator 11 is coupled to a current driver 13 of a laser 14 which comprises the illumination source of the transmitter 1. The range generator 11 provides sequential drive or "on" pulses to the illuminator and sequential drive pulses to the gating supply 19. The delay between these sequential pulses is preselected and determines the range from which energy is collected and the illuminator control 12 provides a signal to control the length and intensity of the illumination pulse produced. The laser 14 is energized by a power supply 15. While the illumination source of the transmitter 1 may comprise many well-known forms, it preferably comprises a form of the laser 14 described in detail with respect to FIG. 4 below.

The receiver 2 includes a receiver lens 16 which collects returned radiation and focuses it on a gated image intensifier 17, optically coupled to a vidicon tube 18. The image intensifier is gated by a gating supply 19 coupled to the range generator 11. The gating supply 19 provides the signal necessary to gate off the receiver. The gate width produced by the gating supply 19 controls the depth of the field of the scene viewed. Timing of the system is fully described with respect to FIG. 3 below. The output of the vidicon tube 18 is coupled to utilization means. Such utilization means in the present embodiment comprises an optical display 22 and a digital range readout 23. Further, a scene brightness integrator 24 may be coupled to the vidicon tube 18 for purposes of providing a method of discrimination for signaling the presence of return from a target.

Operation of the Circuit

The operation of the system along with significant features of the invention, is explained with respect to FIG. 2, in which the abscissa is time and the ordinate is an arbitrary voltage scale. FIG. 2a represents two cycles of the output of the synchronism generator 10, and corresponds to one scanning line of the vidicon tube. FIGS. 2b and 2c represent the receiver gate pulse provided by the gating supply 19 and the illuminator "on" pulse supplied by the range generator 11 respectively.

The output frequency of the synchronism generator 10, which corresponds to the rate of sweep of the vidicon tube 18, is chosen to be high. A high sweep rate is one which causes the vidicon tube 18 to sweep the area it views a sufficient number of times each second to provide a real time output at the display 22. For purposes of the present example, the frequency of the control unit is chosen to be 15.750 KHz. Consequently, in the present example the period $t$ of one cycle of timing unit 9 is equal to approximately 63 microseconds.

The reference point chosen to examine as a beginning of an operating cycle of the system is the end of a line scan of the vidicon tube 18 which commences at time $t_o$. At a predetermined time $t_2$, determined by the setting of the range generator 11, the illumination pulse produced by the illumination source 1 is initiated. The length of the pulse is determined by the illuminator control 12, and the illumination pulse ends at time $t_3$. The width of the illumination pulse is preferably 0.4 to 1.2 microseconds. The illumination pulse width is chosen on two bases. First, the length of the illumination pulse is a factor in the resolution of the system, secondly, the illumination pulse is preferably at least as narrow as the receiver gate width so that energy is not expanded to which the receiver 2 will not respond.

At time $t_a$, the receiver 2 is gated. The receiver gate pulse ends at time $t_1$. The delay between $t_a$ and $t_2$ is determined by timing circuitry in the range generator 11. The delay from $t_a$ to $t_1$ (receiver gate width) determines the depth of range of objects to whose returns the receiver 2 will respond. For example, if the receiver gate width is 0.5 microseconds, the pulse from the illuminator 1 travels 500 feet during this time. The receiver 2 will see a lighted area 250 feet deep. The range at which this 250 foot lighted area appears is dependent upon the interval $t_a$-$t_2$. The system is synchronized such that the receiver is gated during the blanking pulse provided by the synchronism generator 10 to the vidicon tube 18 in order to minimize receiver noise. This synchronization is, of course, a matter of choice.

Utilization of the high pulse repetition frequency of 15.750 KHz substantially increases the resolution of the output image and thus substantially extends the viewing range of the system. To understand why this is so it is necessary to understand the response characteristics of beam-scan type receiving tubes such as vidicon 18. It has long been known that the image resolution (clarity) obtainable with such devices when operating in the pulsed mode is a function of the average power of the input radiation. Average power may be calculated in accordance with the following formula:

$$\text{Ave. Power} = PP \times PW \times PRF$$

where:
PP = Peak Power (amplitude) of received radiation pulses,
PW = Pulse Width of received radiation pulses and,
PRF = repetition frequency of received radiation pulses.

In seeking to increase resolution for systems of the type described herein by increasing average power, it is apparent that any one of the three indicated parameters may be increased. Lengthening the pulse width, however, must be ruled out since that destroys range selectivity and increases the extent to which the system is subjected to the adverse effects of backscatter as previously described. Thus, to increase resolution one must increase either the peak power or the pulse repetition frequency. For reasons which are not yet fully understood, it has been found that far better resolution results are obtained by increasing the pulse repetition frequency rather than boosting peak power. Possible reasons for this result might lie in the fact that a receiving device such as a vidicon does not have reciprocity between average power, time and resolution and, further, because saturation effects are experienced to a greater extent when higher peak levels of radiation pulses are utilized. A further reason might have to do with decay of the capacitively stored energy in the photoconductor of the receiving vidicon during the interval between input radiation pulses.

Resolution curves such as those shown in FIG. 6 demonstrate the difference between a system operating at low peak power and high pulse repetition frequency and a system operating with high peak power and low pulse repetition frequency.

If in the present embodiment a scan raster having 525 horizontal lines is employed with a raster regeneration frequency of 30 Hz (i.e., horizontal scan line frequency of 15.75 KHz), each incremental portion of the stored image receives 525 radiation input pulses between successive destructive readouts by the scan beam. In other words, after the scanning beam passes a point in the imaged viewing area that point receives 525 new image impulses before the beam once again reads the image data therefrom.

Highly satisfactory resolution is obtained at that pulse repetition rate. As suggested above, one of the reasons for this might be that the scanning beam never encounters image data more than 63.5 microseconds old. Comparing this with, for example, a system that generates an illumination pulse only at the beginning of each raster generation image data as old as 16,667 microseconds is encountered by the scanning beam (assuming a raster regeneration rate of 60 Hz).

Somewhat lower pulse repetition frequencies than 15.750 KHz may be employed with results substantially as satisfactory. For example, the system could employ, without substantial modification, a pulse repetition frequency of 7.875 KHz simply by timing the illuminator and receiver gating pulse trains such that an illumination pulse is generated during the blanking interval just prior to every second horizontal scan line rather than every horizontal scan line as described above. With such a system, again assuming a 525 line raster, the image on the photoconductor of the vidicon is refreshed 262 times during each raster scan and the oldest image data encountered by the beam never exceeds 137 microseconds in age.

As implied by the above discussion, the high pulse repetition frequency utilized in the system enables use of lower peak pulse amplitudes. It is believed that maximum system effeciency is obtained when the average power delivered by the received radiation is sufficient to bring the vidicon photoconductor to the saturation level but not beyond.

The saturation point is indicated by the dashed line in FIG. 6. In other words, once the desired pulse width and pulse repetition frequency have been determined the amplitude of the illumination pulses should be set to deliver to the receiver an average power of A (see FIG. 6). As FIG. 6 indicates, increasing the peak power of the illuminator pulses to deliver an amount of average power to the receiver exceeding the level A does not increase the resolution obtained. The relation of illumination pulse amplitude to received pulse amplitude is, of course, a function of the attenuation experienced by the illumination radiation in traveling from the illuminator to the receiver. The attenuation is in turn a function of the distance from the source to the target, the type of propagation medium and the reflectivity of the target. Given values for those parameters in a typical viewing application, i.e., expected viewing range, weather conditions and type of target, one can readily set the illumination pulse amplitude to the level resulting in maximum efficiency. It is believed that when operating at the level of optimum efficiency the received radiation maintains those areas on the vidicon photoconductor corresponding to the brightest portions of the image at the saturation point or just below it.

The revolver pulse width also forms a portion of the present invention. One reason for the use of the relatively narrow receiver pulse gate width is better response under adverse weather conditions. In foul weather, illumination returned to the receiver is diffused by moisture in the air. This diffusion decreases the contrast of the returned image. By reducing the gate width time, the backscatter effect on the contrast of the image is reduced. It has been discovered that the relationship between the contrast and pulse gate width is nonlinear. For a given set of weather conditions, one level of contrast corresponds to a receiver pulse gate width. A nominal situation, i.e. viewing a target at a distance of five miles in a medium haze condition, is illustrated in FIG. 3 in which the abscissa is pulse gate width and the ordinate is arbitrary units of contrast. Contrast may be expressed as the ratio of the difference between the "white level" and "black level" at the receiver 2 to the "white level". A first order of magnitude of effect is encountered when the receiver pulse gate width is greater than five microseconds. A second order backscatter effect is encountered with receiver pulse gate widths between one and five in accordance with the present invention. It has been discovered that there is a significant reduction of the backscatter effect on constrast when the receiver pulse gate width is reduced to one microsecond or less.

The receiver gate pulse is of further significance in determining performance of the system in the following manner. By utilizing pulse-shaping circuitry, to produce a sharp rise time and sharp fall time of the gate pulse at times $t_0$ and $t_1$, sharpness of the returns from the edges of the range cell defined by the receiver pulse gate is improved. By producing a rise time and fall time of under 60 nanoseconds, range information to an accuracy of less than 60 feet to any target within the viewing range of the system can be obtained. (It should be noted that in this respect, the system of the present invention differs from the predominant form of conventional radar tracking system, split gate range tracking. In split gate range tracking, resolution is not a function of receiver gate rise time and fall time.)

Further in accordance with the present invention, the system may be utilized to provide a backlighted image of a target in field of view.

Backlighting of the target may be achieved by first acquiring the target in the conventional manner, namely by changing the range of the system until a return is received. The range is then set at some distance beyond the target. Consequently, returns are received from objects at a greater distance than the target, and the target is silhouetted. Such backlighting can improve contrast between a target and its surrounding.

Thus the present invention may be used in conjunction with a method for visual discrimination comprising the steps of illuminating the target, selecting a receiver range, and adjusting the receiver range to maximize contrast of a target and a background.

Further in accordance with the subject invention, efficiency of use of optical power is maximized by matching the field patterns of the illuminator 1 and receiver 2. As seen in FIG. 4, the common laser illuminator has a conical beam, while a receiver scan pattern has a rectangular pattern cross section. Thus the receiver can respond to a maximum of only sixty per cent of the radiation produced by the illuminator 1. In accordance with the present invention, a laser 14 is provided which projects a beam having the same aspect ratio as the projected useful area of the receiver 2. This is accomplished through the arrangement of FIG. 5.

In FIG. 5, a preferred form of the illuminator 1 is illustrated in detail. Light is provided by a rectangular array of laser diodes 40. A rectangular quartz rod 43 is placed adjacent to the array 40, and serves as an optical integrator. The quartz rod 43 mixes the light provided by the diodes 41 and projects a rectangular pattern to a lens 44 which projects the illuminator pattern. The diodes are pumped by a current driver (not shown) and cooled by a well-known dewar flask 46.

The present invention thus provides an active electro-optic detection system operating with short pulses of light at a low duty cycle to provide maximum visual response in foul weather. Further, in the preferred form an illuminator is provided by which maximum efficiency of illumination is obtained.

I claim:

1. An electro-optical viewing system comprising, in combination:

illumination means adapted for pulsed operation;

photosensitive receiving means adapted for gated operation and including scanning means for sequentially reading out incremental portions of an imaged viewing area in accordance with a raster pattern which is regenerated at a predetermined frequency; and timing means for generating a first pulse train for pulsing said illumination means and a second pulse train synchronized with said first pulse train for gating said receiving means, the repetition rate of pulses in said pulse trains being substantially in excess of the frequency at which said scanning raster pattern is regenerated such that the image at each said viewing area increment is renewed a substantial number of times during the interval between successive readouts of said increment by said scanning means.

2. The electro-optical viewing system set forth in claim 1 wherein:

said receiving means includes photosensitive image generation means having an electrical output characteristic which saturates in response to a predetermined level of input radiation; and said illumination means includes means for fixing the amplitude of the illumination pulses at a level such that pulses reflected to said receiving means from a typical target range during said interval between successive readouts deliver a level of power to said receiving means sufficient to saturate only those areas of said image generation means illuminated by the brightest portions of the image embodied in said input radiation.

3. The electro-optical viewing system set forth in claim 1 wherein:

the repetition rate of pulses in said pulse trains is more than 500 times greater than the regeneration frequency of said scanning raster pattern.

4. The electro-optical viewing system set forth in claim 1 wherein:

said scanning means comprises beam deflection means for moving a readout beam through a raster pattern comprising a plurality of parallel scan lines and means for blanking said beam during a blanking interval occuring after generation of each scan line, and said timing means comprises means for generating each pulse of said second pulse train during a blanking interval.

5. The electro-optical viewing system set forth in claim 1 wherein:

said scanning means comprises beam deflection means for moving a readout beam through a raster pattern comprising a plurality of parallel scan lines and means for blanking said beam during a blanking interval occuring after generation of each scan line, and said timing means comprises means for generating a pulse of said second pulse train during each of said blanking intervals.

6. The electro-optical viewing system set forth in claim 1 wherein said illumination means includes a radiation source constructed and arranged to cast an illumination beam geometrically coincident with the shape of said imaged viewing area.

7. The electro-optical viewing system set forth in claim 6 wherein said radiation source comprises:

an array of radiation emitting diodes arranged in the same aspect ratio as that of said imaged viewing area;

a rectangular quartz rod arranged to optically integrate the radiation output of said diode array; and a lens system for projecting the output of said quartz rod onto a target area.

8. An electro-optical viewing system comprising, in combination:

a. a pulsed illuminator;

b. a gated receiver;

c. a timing unit coupled to said illuminator and said receiver and including means for sweeping said receiver at a high frequency such that said receiver provides a real time display and further including means for synchronizing the pulsing of said illuminator and the gating of said receiver within each sweep cycle, said timing unit providing a pulse repetition frequency exceeding 10 KHz; and d. said timing unit including further means for gating said receiver and providing a receiver gate pulse having a width of less than 1 microsecond, whereby improved range resolution and foul weather response is provided.

9. A system according to claim 8 in which said timing unit includes means for generating illuminator control pulses of shorter duration than said receiver gate pulses.

* * * * *